Figure 1:
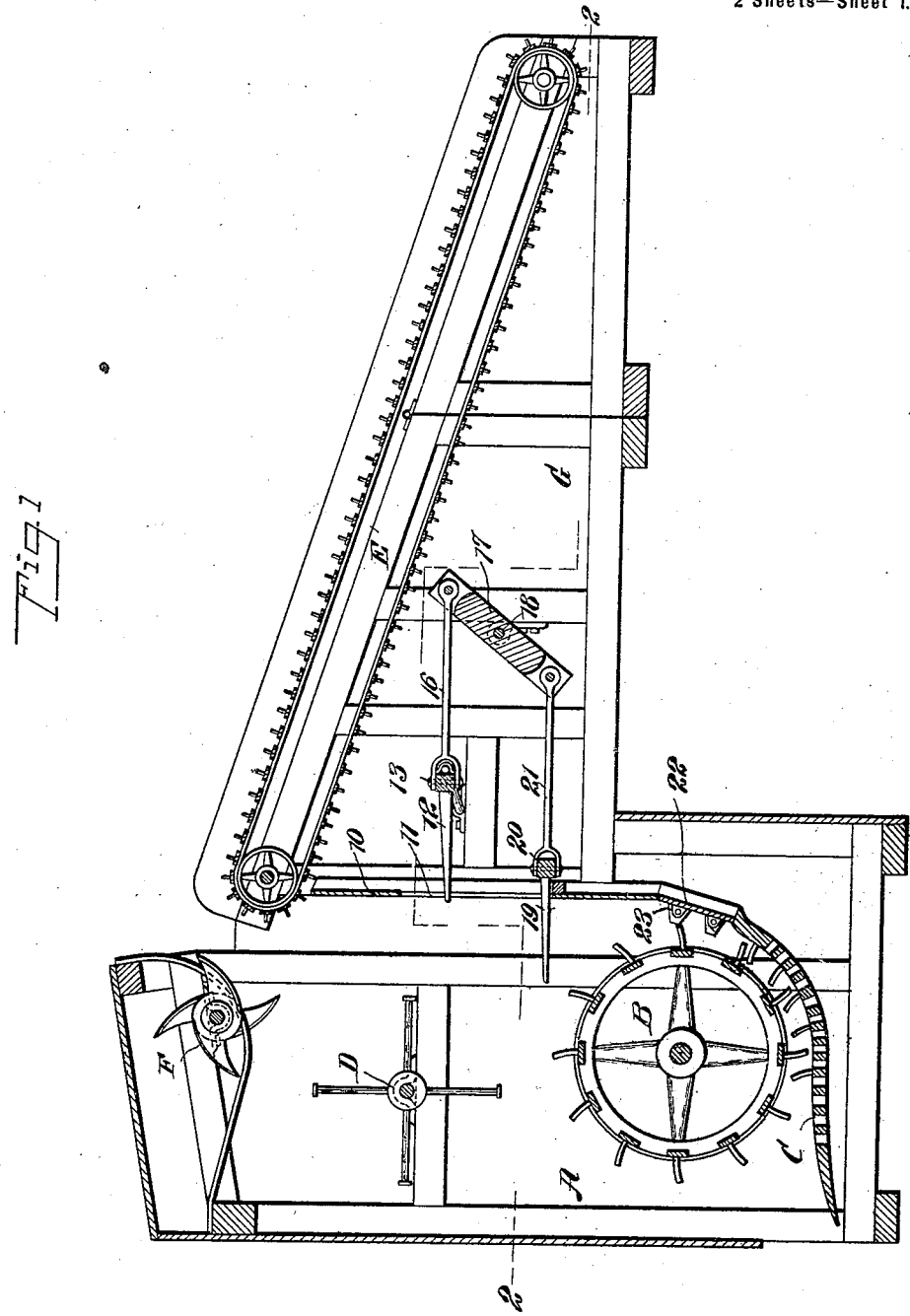

No. 691,215. Patented Jan. 14, 1902.
J. F. WELCH.
FEED DEVICE FOR THRESHING MACHINES.
(Application filed Apr. 9, 1901.)
(No Model.) 2 Sheets—Sheet 1.

WITNESSES:

INVENTOR
John F. Welch
BY
ATTORNEYS

No. 691,215. Patented Jan. 14, 1902.
J. F. WELCH.
FEED DEVICE FOR THRESHING MACHINES.
(Application filed Apr. 9, 1901.)
(No Model.) 2 Sheets—Sheet 2.
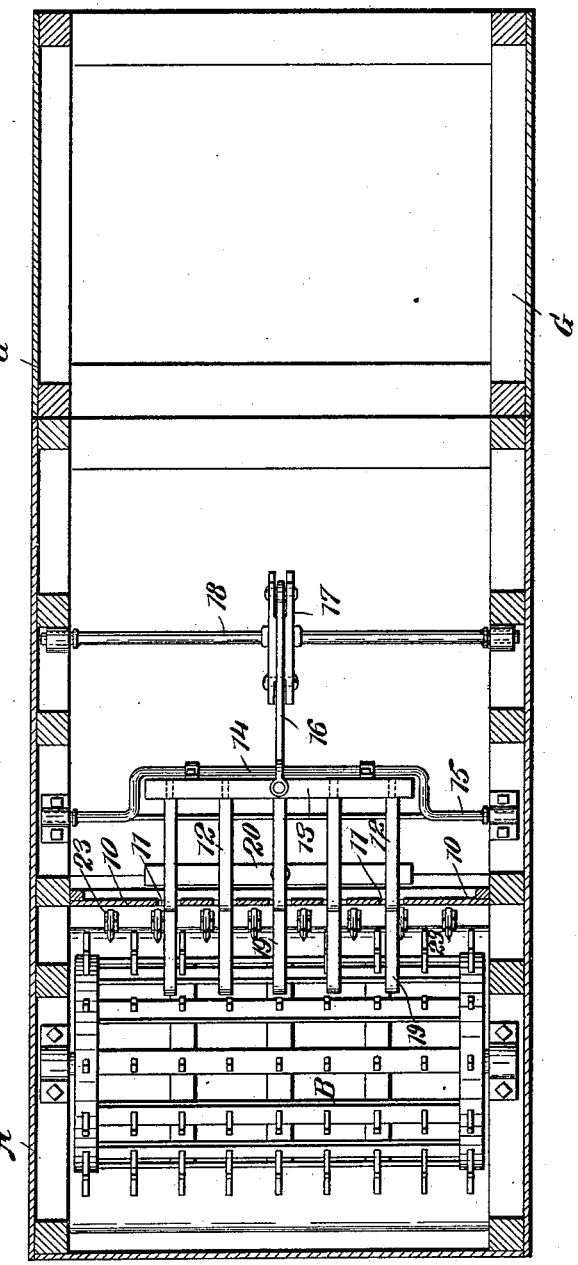
WITNESSES:
INVENTOR
John F. Welch
BY
ATTORNEYS

UNITED STATES PATENT OFFICE.

JOHN FRANKLIN WELCH, OF BRAMAN, OKLAHOMA TERRITORY.

FEED DEVICE FOR THRESHING-MACHINES.

SPECIFICATION forming part of Letters Patent No. 691,215, dated January 14, 1902.

Application filed April 9, 1901. Serial No. 55,027. (No model.)

*To all whom it may concern:*

Be it known that I, JOHN FRANKLIN WELCH, a citizen of the United States, and a resident of Braman, in the county of Kay and Territory of Oklahoma, have invented a new and Improved Feed Device for Threshing-Machines, of which the following is a full, clear, and exact description.

The purpose of the invention is to so construct a feed device for threshing-machines that after the band-cutters have acted upon the bands the bundles of straw will be thoroughly shaken up, loosened, or separated, and delivered in that condition to the cylinder and concave without danger of "slugging" the cylinder.

A further purpose of the invention is to provide a series of knives arranged in opposition to the teeth of the cylinder and corresponding in each series in number and as a whole in position to a row of cylinder-teeth, which knives serve to render the bands of the bundles into fragments before the bands are taken up by the cylinder.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a vertical longitudinal section through the receiving portion of the threshing-machine and a like section through the attachment, and Fig. 2 is a horizontal section taken practically on the line 2 2 of Fig. 1.

A represents the receiving portion of a threshing-machine; B, the cylinder, which may be of any type; C, the concave, and D one of a series of beaters located above the cylinder and adapted to draw the straw from the band-cutters F and deliver the straw to the cylinders in more or less of a scattered or separated condition. The band-cutters F are located above the beaters D and may be of any suitable description. These band-cutters F are opposite the delivery end of a feed-table or conveying-belt E, which is given a downward and outward inclination and is supported by a two-piece frame extension G, attached to the receiving end of the receiving portion A of the threshing-machine. The two parts of the support G have a hinged connection, so that one part may be folded up upon the other when the machine is not in operation, and the conveyer-belt or feed-table is at the same time also folded upon itself, thus reducing the extension from the receiving end of the threshing-machine.

A partition 10 is located at the inner end of the extension-frame G, and this partition is provided with a series of longitudinal slots or openings 11, as is best shown in Fig. 1. A series of feeding forks or fingers 12 are used in connection with the partition 10, the fingers or forks passing through the respective slots 11. These feeding fingers or forks 12 are secured to a head 13, and the said head is mounted upon the crank-arm 14 of a crank-shaft 15, journaled in suitable bearings in the extension-frame G, as is shown best in Fig. 2. The head 13 is connected at its center with a link 16, and this link is pivotally connected at its opposite or rear end with a rocking arm 17, mounted to turn upon the central portion of a shaft 18, carried by the extension-frame G, or this rocking arm 17 may be secured to the shaft 18 and the said shaft be revolubly mounted in its bearings.

The feeding fingers or forks 12 move in a circle to and from the cylinder and serve to draw the straw to the cylinder after it has passed the beaters D and likewise to toss the straw, thus assisting greatly in its separation from the bundle-form. A second set of feeding forks or fingers 19 are located below the upper set 12, and the forks or fingers 19 of the lower set likewise pass through the slots 11 in the partition 10. The lower forks or fingers 19 are attached to a head 20, and this head is connected at its central portion by a link 21 with the lower end of the rocking arm 17, so that when the said rocking arm is set in motion, which may be accomplished in any desired way, the lower set of forks or fingers 19 move horizontally backward and forward and prevent too much straw being received by the cylinder. In other words, the lower set of forks or fingers prevent slugging of the cylinder.

A solid shield or partition 22 is located in front of the cylinder B, extending from the lower end of the slotted partition or shield 10 to the concave C, and on the inner face of the solid shield or partition 22 a series of knives 23 are secured, arranged in rows, the knives in each row corresponding in number to the position and number of a row of teeth on the cylinder, the cylinder-teeth being adapted to pass between the knives, so that before the straw is acted upon jointly by the cylinder and the concave the knives 23 will cut the bands of the bundles into small pieces, thus preventing the said bands from becoming entangled with the teeth of the cylinder or the teeth of the concave.

Having thus described my invention, I claim as new and desire to secure by Letters Patent—

1. In a feed device for threshing-machines, a series of fingers or feeding-forks, a head to which the feeding fingers or forks are secured, a horizontally-arranged crank-shaft having a crank-arm upon which the said head is mounted, a rocking arm mounted to swing in a vertical plane, a link connecting the said head at its center with the upper end of the rocking arm, a second and lower set of feeding fingers or forks, a head to which said second set of feeding-fingers are secured and a link connecting the said head at its center with the lower end of the rocking arm, whereby the sets of feeding fingers or forks act alternately.

2. In a feed device for threshing-machines, a cylinder, a concave, a feed-table or conveyer-belt, a crank-shaft mounted below the forward end of the feed-table, feed-fingers connected with the crank-shaft, a rocking arm mounted to swing in a vertical plane, a link connection between the said feed fingers or forks and the upper end of the rocking arm, a second and lower set of feed fingers or forks and a straight link connection between the lower set of forks or fingers and the lower end of the rocking arm, whereby the upper set of fingers have movement in the arc of a circle to and from the cylinder and the lower set have a horizontal movement, the sets of fingers acting alternately.

3. The combination, with the receiving portion of a threshing-machine, its concave and cylinder, its band-cutters and beaters, located above the cylinder, of a feed-table having its delivery end arranged opposite the band-cutters, a support therefor, a shield extending downward from the upper portion of the feed-table to a point opposite the cylinder and having vertical slots therein, a crank-shaft mounted in the support for the feed-table, feed-fingers connected with the crank-shaft and adapted to extend through the slots in the said shield, a rocking arm mounted to swing in a vertical plane, a link connection between the said feed fingers or forks and the upper end of the rocking arm, a second and lower set of feed fingers or forks which also have movement through the slots in the shield, and a straight link connection between the lower set of forks or fingers and the lower end of the rocking arm, whereby the upper set of fingers have movement in the arc of a circle while the lower set of fingers have a horizontal movement, and whereby one set of fingers act when the other set of fingers or feed-forks are withdrawn.

4. In a feed device for threshing-machines, a cylinder, a concave, beaters and band-cutters located above the cylinder, a frame attached to the receiving end of the threshing-machine, a feed-table or conveyer-belt supported by said frame and having its delivery end located opposite the band-cutters, a shield provided with slots and extending from the delivery end of the feed-table to the concave, knives secured to the lower part of said shield above the concave and extending toward the cylinder, an upper set of feeding-fingers extending through the slots in the shield and having movement in the arc of a circle and a lower set of feeding-fingers also extending through the slots in the shield and having a horizontal movement.

In testimony whereof I have signed my name to this specification in the presence of two subscribing witnesses.

JOHN FRANKLIN WELCH.

Witnesses:
G. E. DOWIS,
F. M. BUTCHER.